United States Patent
Pfeiffer et al.

(10) Patent No.: US 10,843,375 B2
(45) Date of Patent: Nov. 24, 2020

(54) PROCESS FOR PRODUCING WOOD-BASED OSBS HAVING REDUCED EMISSION OF VOLATILE ORGANIC COMPOUNDS (VOCS)

(71) Applicant: SWISS KRONO Tec AG, Lucerne (CH)

(72) Inventors: Sabrina Pfeiffer, Kyritz (DE); Norbert Kalwa, Horn-Bad Meinberg (DE)

(73) Assignee: SWISS KRONO Tec AG, Lucerne (CH)

( * ) Notice: Subject to any disclaimer, the term of this patent is extended or adjusted under 35 U.S.C. 154(b) by 136 days.

(21) Appl. No.: 16/108,797

(22) Filed: Aug. 22, 2018

(65) Prior Publication Data
US 2019/0070747 A1    Mar. 7, 2019

(30) Foreign Application Priority Data
Sep. 7, 2017    (EP) .................... 17189807

(51) Int. Cl.
| | |
|---|---|
| B27N 3/24 | (2006.01) |
| B27N 7/00 | (2006.01) |
| B27N 1/00 | (2006.01) |
| B27N 3/00 | (2006.01) |
| B27K 5/00 | (2006.01) |
| B27N 3/14 | (2006.01) |
| B27K 1/02 | (2006.01) |
| B27K 1/00 | (2006.01) |
| B27N 3/04 | (2006.01) |
| B01D 11/02 | (2006.01) |
| B27N 3/18 | (2006.01) |

(52) U.S. Cl.
CPC .............. *B27N 7/005* (2013.01); *B01D 11/02* (2013.01); *B01D 11/0269* (2013.01); *B27K 1/00* (2013.01); *B27K 1/02* (2013.01); *B27K 5/001* (2013.01); *B27K 5/0085* (2013.01); *B27N 1/003* (2013.01); *B27N 3/002* (2013.01); *B27N 3/04* (2013.01); *B27N 3/143* (2013.01); *B27N 3/18* (2013.01); *B27N 3/24* (2013.01); *B27K 2200/15* (2013.01); *B27K 2240/10* (2013.01)

(58) Field of Classification Search
USPC ........................................... 162/181.9
See application file for complete search history.

(56) References Cited

U.S. PATENT DOCUMENTS

| | | | |
|---|---|---|---|
| 6,098,679 A | 8/2000 | Go et al. | |
| 7,537,669 B2 * | 5/2009 | Jarck | B27N 1/00 156/264 |
| 8,075,735 B2 * | 12/2011 | Jarck | B27J 7/00 162/27 |
| 2009/0095694 A1 | 4/2009 | Owens | |
| 2014/0363664 A1 | 12/2014 | Gier et al. | |

FOREIGN PATENT DOCUMENTS

| | | | | |
|---|---|---|---|---|
| CN | 106272873 A | * | 1/2017 | ............. B27L 11/02 |
| WO | 2013107599 A1 | | 7/2013 | |

* cited by examiner

*Primary Examiner* — Mark Halpern
(74) *Attorney, Agent, or Firm* — The Webb Law Firm

(57) ABSTRACT

A process for treating wood strands suitable for producing OSBs includes treating the wood strands in water at a temperature in the range from 50° C. to 100° C. The present invention likewise relates to a process for producing wood-based OSBs, in particular wood-based OSBs having reduced emission of volatile organic compounds (VOCs), including: a) production of wood strands from suitable timbers; b) treatment of at least part of the wood strands with water; c) drying of the wood strands which have been treated with the water; d) coating of the wood strands which have been treated with water and dried and coating of wood strands which have not been treated with water with at least one binder; e) scattering of the glue-coated wood strands on a conveyor belt; and f) pressing of the glue-coated wood strands to give a wood-based OSB.

16 Claims, 3 Drawing Sheets

PROCESS FOR PRODUCING WOOD-BASED OSBS HAVING REDUCED EMISSION OF VOLATILE ORGANIC COMPOUNDS (VOCS)

CROSS-REFERENCE TO RELATED APPLICATION

This application claims priority to European Patent Application No. 17 189 807.5 filed Sep. 7, 2017, the disclosure of which is hereby incorporated in its entirety by reference.

BACKGROUND OF THE INVENTION

Field of the Invention

The present invention relates to a process for treating wood strands with water, an apparatus for carrying out the water treatment, a process for producing wood-based OSBs and a production line for producing wood-based OSBs.

Description of Related Art

Coarse chipboards, also referred to as OSBs (oriented strand boards), are wood-based boards which are produced from long strands. OSBs are increasingly being used in the fitting-out of wooden and finished houses since OSBs are light and nevertheless meet the static requirements demanded of building boards. Thus, OSBs are used as building boards and as wall or roof boarding or in floors.

OSBs are produced in a multistage process, with the shavings or strands firstly being peeled off from debarked round wood, preferably conifer wood, in the longitudinal direction by means of rotating knives. In the subsequent drying operation, the natural moisture content of the strands is reduced at high temperatures. The moisture content of the strands can vary as a function of the adhesive used, but the moisture content should be significantly below 10% in order to avoid cracks in later pressing. Depending on the adhesive, wetting of rather moist strands or of dry strands can be more advantageous. In addition, very little moisture should be present in the strands during the pressing operation in order to reduce the vapour pressure arising during the pressing operation substantially since this could otherwise cause the raw board to burst.

After drying of the strands, these are introduced into a glue-coating apparatus in which the glue or adhesive is applied in a finely distributed manner on the strands. PMDI (polymeric diphenylmethane diisocyanate) or MUPF (melamine-urea-phenol-formaldehyde) glues are predominantly used for glue application. The glues can also be used as mixtures in the OSBs. These glues are used because the OSBs are, as mentioned above, frequently used for structural applications. There, it is necessary to use moisture- or wetness-resistant glues.

After coating with glue, the glue-coated strands are alternately scattered longitudinally and transverse to the production direction in scattering apparatuses so that the strands are arranged crosswise in at least three layers (lower covering layer-middle layer-upper covering layer). The scattering direction of lower and upper covering layer is the same, but deviates from the scattering direction of the middle layer. The strands used in the covering layer and middle layer are also different from one another. Thus, the strands used in the covering layers have a large area and the strands used in the middle layer have a smaller area through to chip-shaped. Two material streams are usually operated in the production of the OSBs: one with large-area strands for the future covering layers and one with "chips" for the middle layer. Correspondingly, the strands in the middle layer can be of lower quality since the bending strength is produced essentially by the covering layers. For this reason, fine material which is formed during shredding can also be used in the middle layer of OSBs. The percentage distribution between middle and covering layer is at least 70%:30%. After scattering of the strands, continuous pressing of these is carried out under high pressure and at high temperature, e.g. from 200 to 250° C.

OSBs are, not least because of their durability, enjoying ever greater acceptance and wide use, for example as structural element in house construction or as shuttering in concrete construction. However, the hygroscopic properties inherent in wood-based materials are disadvantageous in some applications.

Particularly when OSBs are used in the interior sector, emission of wood constituents is considered to be critical. This is, in particular, a problem in the case of OSBs made from pine wood since these display particularly high emissions of volatile organic compounds.

During the course of the production of wood-based boards and in particular due to the production process for the wood strands, many volatile organic compounds are formed or liberated. Volatile organic compounds, also referred to as VOCs, include volatile organic materials which vaporize readily or are present as gas even at relatively low temperatures, for example at room temperature.

The volatile organic compounds (VOC) are either originally present in the wood material and are released therefrom during the work-up or they are, according to the present-day state of knowledge, formed by the degradation of unsaturated fatty acids, which are in turn decomposition products of the wood. Typical transformation products which occur during processing are, for example, pentanal and hexanal, and also octanal, 2-octenal or 1-heptenal. Conifer timbers in particular, from which OSBs are predominantly produced, contain large amounts of resin and fats which lead to formation of volatile organic terpene compounds and aldehydes. However, VOCs, and also the aldehydes mentioned, can be formed or liberated during use of particular adhesives for the production of the wood-based materials.

The emission of constituents of OSBs is critical especially because this material is predominantly used in uncoated form. As a result, the constituents can evaporate unhindered. In addition, the OSBs are frequently used for cladding/boarding of large areas, which usually results in a high room loading (m² of OSB/m³ of room air). This additionally leads to concentration of particular substances in the air of the room.

In order to solve the problem of VOC emission, various approaches have been described in the past.

Thus, attempts have been made in the past to decrease the emission of the aldehydes by addition of reducing agents. However, many of these reducing agents contained sulfur, which led to undesirable emissions of sulfur dioxide during board production and in later use.

The addition of activated carbon has also been tried, but is not satisfactory for technological and cost reasons.

The addition of suitable VOC scavengers is virtually always carried out after the drying process for the strands since this and also the application of heat in the press was believed to be the cause of the predominant part of the emissions. The addition of the VOC scavengers was carried out in liquid form via the glue-coating system; solids were added at various points during the process (e.g. scattering).

This required additional installation of metering stations which were intended to ensure homogeneous distribution.

It is now a technical object of the invention to improve the process known per se for producing OSBs so as to produce OSBs simply and reliably with a significantly reduced emission of volatile organic compounds (VOCs). Here, at least the emission of terpenes should be reduced. If possible, the production process should be changed as little as possible and the costs should not increase disproportionately. Furthermore, the solution should have a very great flexibility. Finally, ecological aspects should also be taken into account, i.e. the solution should not result in any additional energy consumption or produce additional waste.

SUMMARY OF THE INVENTION

This object is achieved according to the invention by a process for treating wood strands with water, an apparatus for the water treatment, a process for producing wood-based OSBs, and a production line suitable for this purpose.

Accordingly, a process for treating wood strands suitable for producing OSBs, in particular with the objective of reducing the VOC emission from these wood strands, wherein the wood strands are treated in water having a temperature in the range from 50° C. to 100° C., preferably from 60° C. to 90° C., particularly preferably from 70 to 90° C., is provided.

In one embodiment of the present process, the treatment of the wood strands with water is carried out in such a way that the water treatment of the wood strands is carried out over a time of from 10 to 60 minutes, preferably from 15 to 45 minutes, particularly preferably from 20 to 30 minutes.

The wood strands are thus subjected to treatment with hot water over a predetermined time, with the treatment time being dependent on the water temperature. The wood strands which have been treated with the hot water are then introduced additionally or alternatively to untreated wood strands into the known OSB production process.

In addition, auxiliaries which improve the solubility of the volatile compounds in hot water or lead to partial or complete chemical conversion of the volatile compounds into non-volatile compounds can be added to the water.

The treatment with hot water assists a reduction of volatile organic compounds in the wood strands since at least those compounds which have a solubility in hot water are washed out by the treatment and lead to reduced emission from the OSB. The present water treatment can, for example, be carried out according to the countercurrent principle.

The present treatment of the wood strands with water is carried out in a separate water treatment apparatus. The water treatment is carried out outside a shredder (e.g. knife ring shredder or disc shredder) and is thus not part of the shredding or comminution process for timbers for producing wood strands. It is also important that the water treatment can be carried out before drying of the wood strands.

In one embodiment of the present process, the treatment of the wood strands with water is carried out in such a way that the wood strands are completely covered by the water, preferably are completely immersed in the water, during the treatment.

In a further embodiment of the present process, the wood strands are, to carry out the treatment with water, conveyed continuously by means of at least one transport device through an apparatus containing the water (vessel, tank).

The water is preferably discharged from the apparatus after passage of the wood strands. The water discharged from the apparatus has a chemical oxygen demand of 300-100 mg/l, preferably from 500 to 700 mg/l, and is thus considered to be only moderately polluted with organic compounds.

The water discharged from the apparatus can be subjected to a purification step and after purification be recirculated to the apparatus for water treatment. The purification steps advantageously comprise a filtration to remove suspended materials and fine particles and/or a precipitation of dissolved constituents using suitable precipitants.

The wood strands used for the present purposes can have a length in the range from 50 to 200 mm, preferably from 70 to 180 mm, particularly preferably from 90 to 150 mm; a width in the range from 5 to 50 mm, preferably from 10 to 30 mm, particularly preferably from 15 to 20 mm; and a thickness in the range from 0.1 to 2 mm, preferably from 0.3 to 1.5 mm, particularly preferably from 0.4 to 1 mm.

In one embodiment, the wood strands have, for example, a length in the range from 150 to 200 mm, a width in the range from 15 to 20 mm, a thickness in the range from 0.5 to 1 mm and a moisture content of not more than 50%.

The treatment of the wood strands with water is carried out in an apparatus (water contact unit) which comprises the following elements or features:
- at least one vessel filled with water;
- at least one transport device for transporting the wood strands through the vessel; and
- at least one apparatus for dipping the wood strands into the water.

In one variant, the at least one vessel filled with water can be in the form of an immersion tank having at least one water inlet and at least one water outlet. As indicated above, the washing water can be recirculated after purification (filtration, precipitation) back into the water vessel; i.e. the water is circulated in the present apparatus.

The OSB strands to be washed are moved through the water vessel by means of one or more transport rollers. Preference is given to using three or more transport rollers, depending on the size of the water vessel and the quantity of the OSB strands.

The volume of the water contact unit, in particular the water vessel, can be in the range from 20 m$^3$ to 100 m$^3$, preferably from 30 m$^3$ to 80 m$^3$, particularly preferably from 50 m$^3$ to 70 m$^3$. At a production rate of 1600 m$^3$ of OSB per day, which equates to about 66 m$^3$/h, and a residence time of about 15 minutes, a tank size of, for example, at least 50 m$^3$ is required, assuming complete treatment of all strands for the OSB. If only the covering layer or middle layer strands are to be treated, a correspondingly smaller tank volume is required. The size of the tank also takes account of the "bulk density" of the strands in the water.

The residence time of the OSB strands in the water vessel is in the range from 10 to 30 minutes, preferably from 15 to 20 minutes. At an assumed base area of 20 m$^2$ (length: 8 m, width: 2.5 m, height: 2.5 m), a residence time of 15 minutes would correspond to a speed of about 0.5 m/min.

Since the water serves as transport medium, the flow velocity of the water is likewise from 0.2 to 1 m/min, preferably about 0.5 m/min.

The apparatus for dipping the wood strands into the water can, for example, be in the form of a holder-down which ensures that the wood strands are completely under water.

The introduction and discharge of the OSB strands into and from the water vessel are carried out in a suitable way via slopes which are provided at a suitable angle in the water vessel.

After leaving the water treatment apparatus, the strands which have been treated with water have a temperature of from 50 to 70° C. The wood strands go at this temperature from the water treatment apparatus into a dryer (as part of the production line for OSBs), which leads to an increase in the dryer performance. The energy which is consumed for removing wood constituents is thus utilized again for the drying process. In a normal process, the entry temperature of the strands into the dryer is about 25° C.

The invention also provides a process for producing wood-based OSBs having reduced emission of volatile organic compounds (VOCs), which comprises the following steps:
a) production of wood strands from suitable timbers;
b) treatment of at least part of the wood strands with water according to the above-described process;
c) drying of the wood strands which have been treated with the water;
d) coating of the wood strands which have been treated with water and dried and optionally coating of wood strands which have not been treated with water with at least one binder;
e) scattering of the glue-coated wood strands on a conveyor belt; and
f) pressing of the glue-coated wood strands to give a wood-based OSB.

The present process makes it possible to produce wood-based OSBs using water-treated wood strands which are additionally or alternatively to untreated wood strands introduced into a known production process. A wood-based OSB produced by the process of the invention and comprising water-treated wood strands has a reduced emission of volatile organic compounds, in particular of terpenes and aldehydes.

The provision of the present process results in various advantages. Thus, simple production of the wood-based OSBs without significant influencing of the conventional process chain and with significantly reduced emission of volatile organic compounds from the OSB is possible. In addition, the energy requirement for drying the wood strands can be reduced since the wood strands already have an elevated temperature (e.g. of about 50-70° C.) on entry into the dryer; i.e. the energy introduced during the treatment with water assists the drying process.

The production of OSBs in the present process compared to the conventional OSB production processes is altered in that at least part of the strands used are treated with water after they have been produced but before drying. The strands can be those provided for the covering layer or the middle layer. After the treatment, the strands are fed to the drying operation which is normally carried out. This is effected, for example, directly before coating with glue, with complete replacement or only partial replacement of the standard strands being able to be undertaken.

In a further embodiment of the present process, water-treated wood strands or a mixture of water-treated wood strands and wood strands which have not been treated with water are used as middle layer and/or covering layer of the wood-based OSB.

Accordingly, in one variant, complete replacement of the wood strands is possible, with the water-treated wood strands being used in the middle layer and in one or both covering layers or else in all layers.

In another variant, it is possible to make only the middle layer from water-treated wood strands and to use wood strands which have not been treated with water for one or both covering layers. Since water-treated wood strands have a lighter colour, it can accordingly be advantageous to use water-treated wood strands in the covering layer. These therefore give the OSB a more appealing colour.

In still another variant, only one or both covering layers are made from water-treated wood strands and optionally dried wood strands which have not been treated with water are used for the middle layer.

In still another variant, it is conceivable and possible to use a mixture having any desired ratio of water-treated wood strands and wood strands which have not been treated with water in each of the middle and covering layers. In such a case, the mixture can comprise from 10 to 50% by weight, preferably from 20 to 30% by weight, of untreated wood strands (which have not been treated with water) and from 50 to 90% by weight, preferably from 70 to 80% by weight, of water-treated wood strands.

In a further embodiment, the step of treatment of the wood strands with water can be carried out separately from the production process for the wood-based OSBs. Accordingly, the water treatment in this embodiment of the present process is carried out outside the overall process or the process line. The wood strands are in this case discharged from the production process and introduced into the water treatment apparatus (e.g. immersion tank). The water-treated wood strands can then be, optionally after temporary storage, e.g. immediately before coating with glue, introduced again into the conventional production process. This makes high flexibility in the production process possible.

The treatment of the wood strands with water can, in still another embodiment, be integrated into the production process for the wood-based OSBs, i.e. the step of water treatment is included in the overall process or process line and is carried out on-line.

In this case, the treatment with water can be carried out i) directly after shredding and provision of the wood strands or ii) only after screening and separation of the wood strands according to the use of the wood strands for middle layer or covering layer. In the latter case, a separate treatment of the wood strands with water can be carried out according to the requirements for the wood strands used in the middle layer and covering layer.

In a further variant of the present process, the treatment of the wood strands with water is carried out in at least one water treatment apparatus, preferably in two water treatment apparatuses. The water treatment apparatus used in the present case can be or function as batch plant or as continuously operated plant, with a continuously operated plant being preferred.

As indicated above, the water treatment of wood strands used for the middle layer and the covering layers of the wood-based OSB can in each case be carried out separately in at least two water treatment apparatuses. This enables the degree of water treatment of the water-treated wood strands used in the middle and/or covering layer to be matched to the respective requirements and customer wishes. The two water treatment apparatuses used are in this case preferably connected or arranged in parallel.

The contacting of the wood strands with the at least one binder in step d) is preferably carried out by spraying or atomizing the binder onto the wood strands. Many OSB plants thus operate using rotating coils (drums with atomizer glue coating). Mixer coating would also be possible. Here, the strands are mixed intimately with the glue in a mixer by means of rotating blades.

In one embodiment of the present process, a polymer adhesive which is selected from the group consisting of formaldehyde adhesives, e.g. urea-formaldehyde resin adhesive (UF) and/or melamine-formaldehyde resin adhesive (MF), polyurethane adhesives, epoxy resin adhesives, polyester adhesives is preferably used as binder. In the present case, the use of a polyurethane adhesive is preferred, with the polyurethane adhesive being based on aromatic polyisocyanates, in particular polymeric diphenylmethane diisocyanate (PMDI), tolylene diisocyanate (TDI) and/or diphenylmethane diisocyanate (MDI), with particular preference being given to PMDI.

In one variant of the present process, the water-treated wood strands and wood strands which have not been treated with water are coated with an amount of binder of from 1.0 to 5.0% by weight, preferably from 2 to 4% by weight, in particular 3% by weight (based on the total amount of the wood strands).

It is likewise possible to supply at least one flame retardant to the wood strands, either together with or separately from the binder. The flame retardant can typically be added in an amount of from 1 to 20% by weight, preferably from 5 to 15% by weight, particularly preferably 10% by weight, based on the total amount of the wood strands. Typical flame retardants are selected from the group consisting of phosphates, sulfates, borates, in particular ammonium polyphosphate, tris(tribromoneopentyl) phosphate, zinc borate or boric acid complexes of polyhydric alcohols.

The wood strands (treated with water and/or not treated with water) which have been coated with glue are scattered onto a conveyor belt with orientation along the transport direction to form a first covering layer, subsequently scattered transverse to the transport direction to form a middle layer and finally scattered with orientation along the transport direction to form a second covering layer.

After the scattering-on, the glue-coated wood strands are pressed at temperatures in the range from 200 to 250° C., preferably from 220 to 230° C., to give a wood-based OSB.

In a first preferred embodiment, the present process for producing a wood-based OSB having reduced VOC emission comprises the following steps:

production of wood strands from suitable timbers, in particular by means of shredding of suitable timbers;
treatment of the wood strands with water at a temperature in the range from 70° C. to 90° C.;
drying of the wood strands which have been treated with the water;
screening and separation of the water-treated wood strands into wood strands suitable for use as middle layer and covering layer;
coating of the separated wood strands with glue;
scattering of the glue-coated water-treated wood strands onto a conveyor belt in the order: first lower covering layer, middle layer and second upper covering layer; and
pressing of the glue-coated wood strands to give a wood-based OSB.

In a second preferred embodiment, the present process for producing a wood-based OSB having reduced VOC emission comprises the following steps:

production of wood strands from suitable timbers, in particular by means of shredding of suitable timbers;
screening and separation of the wood strands into wood strands suitable for use as middle layer and covering layer;
treatment of the wood strands provided for the middle layer and/or of the wood strands provided for the covering layer(s) with water at a temperature in the range from 70° C. to 90° C.;
drying of the wood strands which have been treated with the water;
coating of the separated water-treated wood strands with glue and coating of wood strands which have not been treated with water with glue;
scattering of the glue-coated wood strands which have been treated with water and not treated with water onto a conveyor belt in the order: first lower covering layer, middle layer and second upper covering layer; and
pressing of the glue-coated wood strands to give a wood-based OSB.

The present process accordingly makes it possible to produce a wood-based OSB having reduced emission of volatile organic compounds (VOCs) and comprising water-treated wood strands.

The present wood-based OSB can consist entirely of water-treated wood strands or consist of a mixture of water-treated wood strands and wood strands which have not been treated with water. In one embodiment, both covering layers and the middle layer of the OSB consist of water-treated wood strands, while in a further embodiment the two covering layers consist of wood strands which have not been treated with water and the middle layer consists of water-treated wood strands and in still another embodiment the two covering layers consist of water-treated wood strands and the middle layer consists of wood strands which have not been treated with water.

The present wood-based OSB can have a bulk density in the range from 300 to 1000 kg/m$^3$, preferably from 500 to 800 kg/m$^3$, particularly preferably from 500 to 650 kg/m$^3$.

The thickness of the present wood-based OSB can be in the range from 5 to 50 mm, preferably from 10 to 40 mm, with a thickness in the range from 15 to 25 mm being particularly preferred.

The wood-based OSB produced by the present process has, in particular, a reduced emission of aldehydes liberated during processing of the wood, in particular pentanal or hexanal, and/or terpenes, in particular carene and pinene.

The liberation of aldehydes occurs during the shredding process and an associated aqueous work-up and purification of the wood strands. Here, specific aldehydes can be formed from the basic building blocks of cellulose or hemicellulose. Thus, for example, the aldehyde furfural is formed from monosaccharides and disaccharides of the cellulose or hemicellulose under acidic conditions and with application of heat, while aromatic aldehydes can be liberated from lignin. The aliphatic aldehydes (saturated and unsaturated) are formed by fragmentation of fatty acids with participation of oxygen.

Owing to the use of water-treated wood strands, the emission of $C_2$-$C_{10}$-aldehydes, particularly preferably acetaldehyde, pentanal, hexanal or furfural, and also of terpenes liberated, in particular $C_{10}$-monoterpenes and $C_{15}$-sesquiterpenes, particularly preferably acyclic or cyclic monoterpenes, from the wood-based OSBs is reduced.

Typical acyclic terpenes are terpene hydrocarbons such as myrcene, terpene alcohols such as geraniol, linalool, ipsenol and terpene aldehydes such as citral. Typical representatives of monocyclic terpenes are p-menthane, terpeninol, limonene or carvone, and typical representatives of bicyclic terpenes are carane, pinane, bornane, with 3-carene and α-pinene being of particular importance. Terpenes are constituents of tree resins and are therefore present in particularly high amounts in highly resin-containing trees such as pine or spruce.

In particular, the great reduction of the aldehydes (and also acetone) could not have been foreseen in any way by a person skilled in the art. Although it can be assumed that water adds onto the double bonds of the unsaturated fatty acids during the treatment with water and aldehyde formation is thus avoided, such additions usually proceed only in the presence of mineral acids (sulfuric acid, phosphoric acid, etc.) and at elevated temperatures because of the low electrophilicity of water. In addition, water is not known as a good reducing agent.

The present process is carried out in a production line for producing an OSB and comprises the following elements:
- at least one apparatus for debarking suitable timber logs;
- at least one shredder for shredding the debarked timber logs to give wood strands;
- at least one apparatus as described above for treatment of at least part of the wood strands with water;
- at least one dryer for drying the water-treated wood strands;
- at least one apparatus for screening and separation of the wood strands (water-treated and not treated with water);
- at least one apparatus for coating the wood strands with glue;
- at least one apparatus for scattering the glue-coated wood strands onto a conveyor belt, and
- at least one press for pressing the scattered wood strands to give an OSB.

As indicated above, the water treatment apparatus can be designed so as to be operated continuously. For this purpose, the wood strands are applied to a conveyor belt which conveys the wood strands at a prescribed speed through the water treatment apparatus (e.g. in the form of an immersion vessel). During passage through the water treatment apparatus, the wood strands are uniformly dipped into the hot water.

The water treatment apparatus can be provided before (upstream of) the apparatus for screening and separation of the wood strands. In this case, all wood strands are subjected to a treatment with water.

However, it is also possible for two water treatment apparatuses to be provided after (downstream of) the apparatus for screening and separation of the wood strands. In this case, one water treatment apparatus serves to treat the wood strands which are provided for the middle layer with water and the other water treatment apparatus serves to treat the wood strands provided for the covering layers with water. This allows a chosen water treatment of the wood strands for the middle layer or the wood strands for the covering layers.

BRIEF DESCRIPTION OF THE DRAWINGS

The invention will be illustrated below with reference to the figures of the drawing for a working example. The drawing shows.

DESCRIPTION OF THE INVENTION

Figure 1:
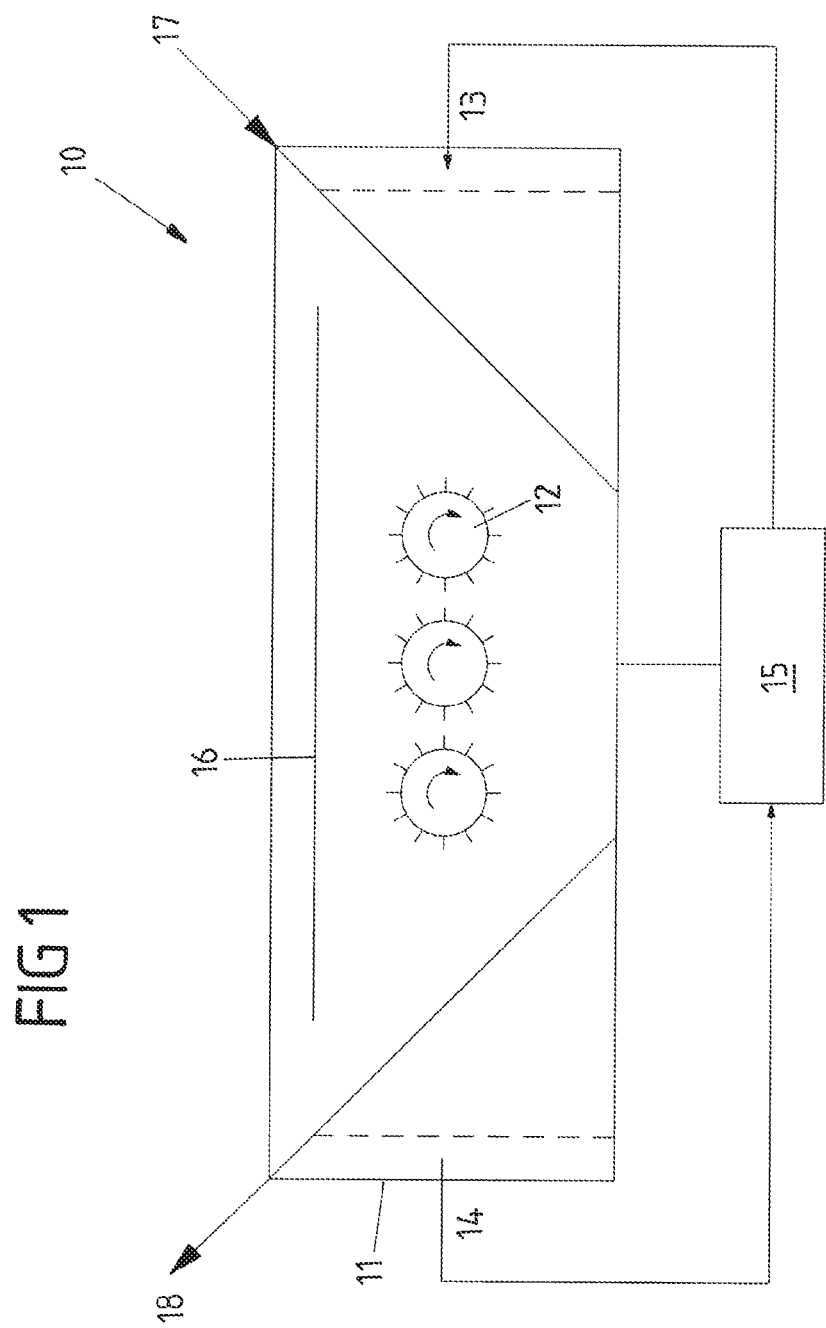
FIG. 1 a schematic depiction of one embodiment of an apparatus for treatment of wood strands with water.

FIG. 1 shows one variant of an apparatus (water contact unit) 10 for treatment of wood strands with water. The apparatus comprises an immersion tank 11 filled with water and a transport facility in the form of three transport rollers 12.

The present apparatus 10 allows treatment of the strands with water before drying of the strands in the drum dryer. Here, all or part of the strands which are provided for later production of the OSB can be treated.

The immersion tank 11 has a water inlet 13 and a water outlet 14. The water discharged through the water outlet 14 can be subjected to a purification step (e.g. filtration or precipitation of impurities) in a purification apparatus 15, heated at the same time and recirculated via the water inlet 13 back into the immersion tank.

The use of a holder-down 16 ensures that the wood strands are completely under water and thus completely surrounded by water.

The introduction and discharge of the OSB strands into and from the immersion tank 11 are carried out in a suitable way via slopes 17, 18 which are provided at a suitable angle in the immersion tank 11. The perforated metal plates make it possible for water to be separated off from the strands.

Figure 2:
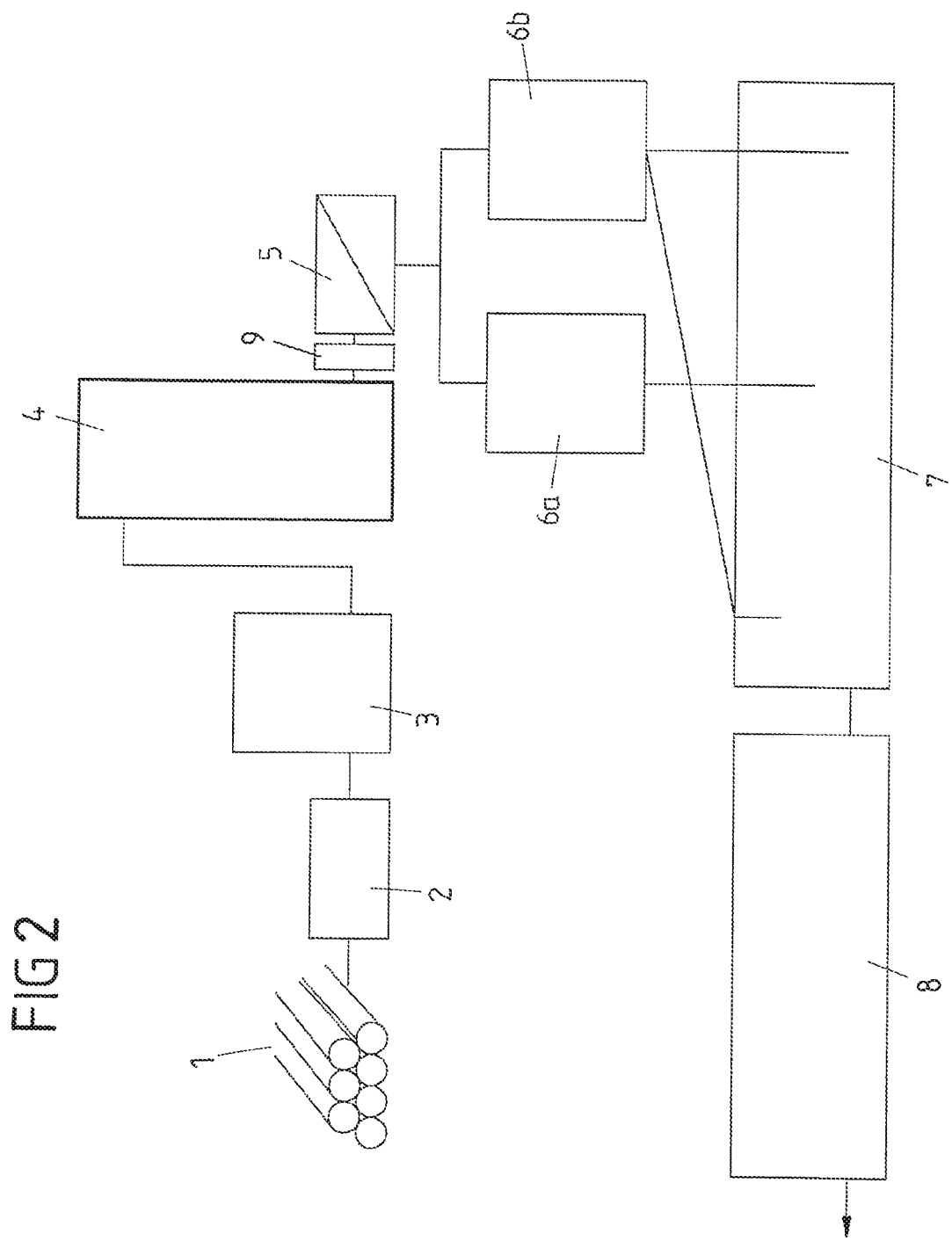
FIG. 2 a schematic depiction of a first embodiment of the process of the invention for producing OSBs, and FIG. 3 a schematic depiction of a second embodiment of the process of the invention.

The first embodiment of the process of the invention, as shown in FIG. 2, describes the individual process steps commencing with the provision of the wood starting material through to the finished wood-based OSB.

Accordingly, suitable wood starting material for producing the wood strands is firstly provided in step 1. All coniferous timbers, timbers from broad-leaved trees or else mixtures thereof are suitable as wood starting material.

The debarking (step 2) and the shredding (step 3) of the wood starting material is carried out in shredders suitable for this purpose, with the size of the wood strands being able to be controlled appropriately. After comminution and provision of the wood strands, these are optionally subjected to a predrying process, with a moisture content of 5-10% of the initial moisture content of the wood strands being set (not shown).

In the case of the embodiment shown in FIG. 2, the wood strands are introduced into a water treatment apparatus (step 4). The water treatment of the wood strands is carried out using hot water having a temperature in the range from 70° C. to 90° C.

The washing water arising here can be discharged from the process and, after one or more purification steps, fed back to the water treatment and thus be recycled.

After conclusion of the water treatment, which in the present case takes about 15-30 minutes, the water-treated wood strands are dried (step 9), screened and separated (step 5).

Separation is carried out into wood strands for use as middle layer (step 6a) or as covering layer (step 6b) with coating with glue in each case.

The glue-coated water-treated wood strands are scattered onto a conveyor belt in the order of first lower covering layer, middle layer and second upper covering layer (step 7) and subsequently pressed to give a wood-based OSB (step 8).

Figure 3:
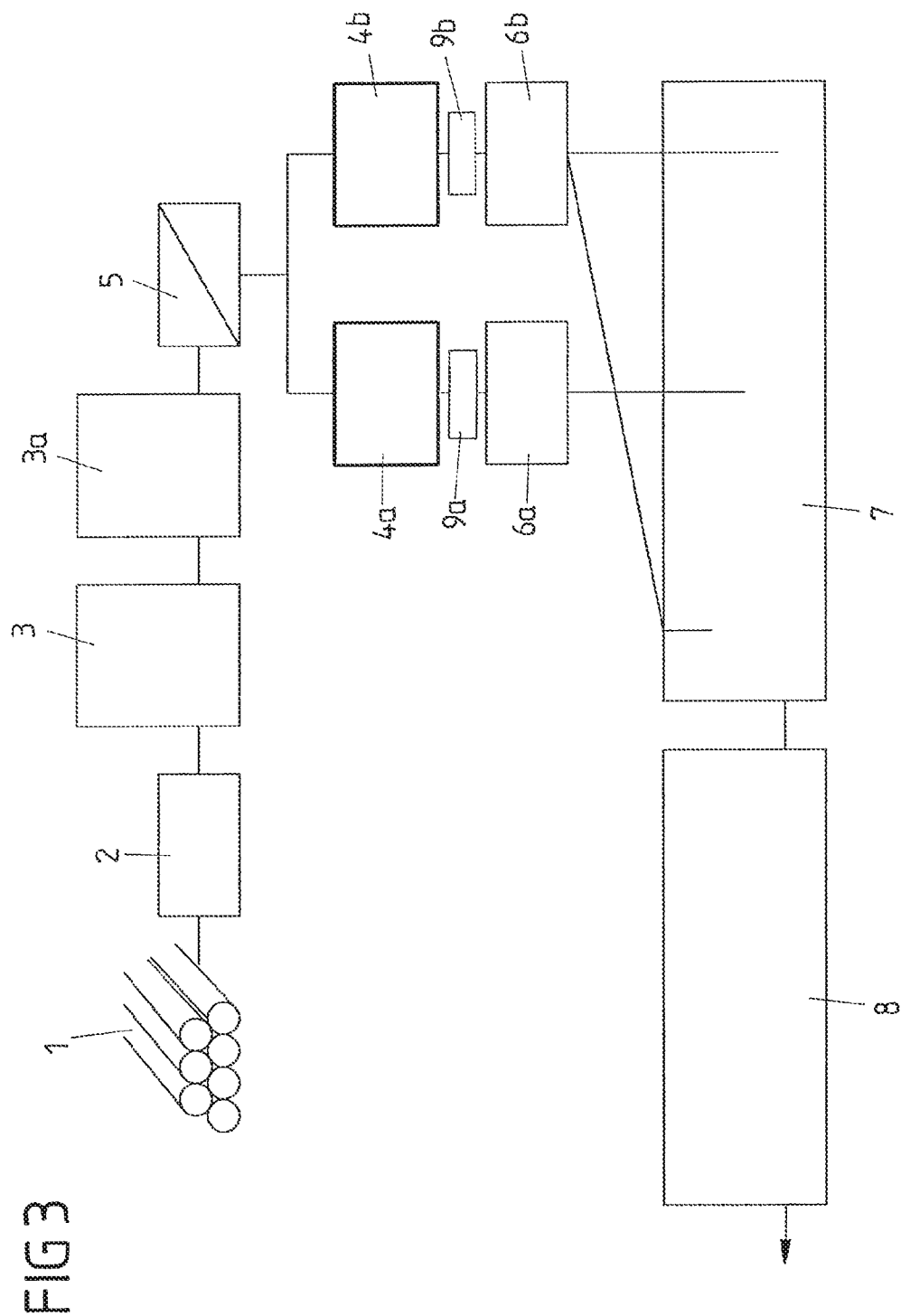

In the second embodiment shown in FIG. 3, the wood starting material is, in a manner analogous to FIG. 1, firstly provided (step 1), debarked (step 2) and shredded (step 3). The wood strands are optionally subjected to a predrying process, with a moisture content of 5-10% of the initial moisture content of the wood strands being set (step 3a).

In contrast to the variant shown in FIG. 2, separation into wood strands for use as middle layer or as covering layer (step 5) occurs as early as after the optional drying.

This is followed by the water treatment of the wood strands provided for the middle layer (step 4a) and/or water treatment of the wood strands provided for the covering layer(s) (step 4b) in a suitable water treatment apparatus in each case. The treatment of the wood strands with water is carried out in a temperature range from 70° C. to 90° C.

It is also possible for only the wood strands for the middle layer to be subjected to a treatment with water, while the wood strands for the covering layers remain untreated.

After conclusion of the water treatment, which in the present case takes about 15-30 minutes, the water-treated wood strands are dried (step 9a, 9b) and coated with glue (steps 6a, b).

The glue-coated water-treated wood strands are scattered onto a conveyor belt in the order first lower covering layer, middle layer and second upper covering layer (step 7) and subsequently pressed to give a wood-based OSB (step 8).

In the final processing step, the wood-based OSB obtained is in each case finished in a suitable manner.

Working Example 1

Strands (length: max. 200 mm, width: 20 mm, thickness: max. 1 mm, moisture content: max. 50%) are produced from pine logs and treated with water having a temperature of 90° C. in a continuously operating process. The treatment is carried out in a vessel through which the strands are slowly transported. Holders-down ensure that the strands are completely under water. The treatment time/residence time in the tank is about 15 min.

The water present in the tank is continuously discharged from the process and freed of suspended materials and fine particles by filtration. Furthermore, the dissolved constituents are precipitated and the water is subsequently returned to the process. The discharged water had a COD (chemical oxygen demand) of 700 mg/l. It is therefore only moderately polluted with organic compounds and can be purified relatively easily.

The strands are then dried in a drum dryer. The energy consumption of the drum dryer is reduced significantly since the strands already have a temperature of about 70° C. on entry into the dryer. They are then coated in a coil with PMDI (about 3% by weight of glue based on dry matter of strands).

The glue-coated strands are scattered as covering layer and middle layer in an OSB plant. The percentage distribution between middle layer and covering layer is at least 70% to 30%. The strands are pressed to give boards which have a bulk density of about 570 kg/m³. After a storage time of about one week, the test board was tested together with a standard board having the same thickness for release of VOCs in a microchamber.

Chamber Parameters:

Temperature: 23° C.; humidity: 0%; airflow: 150 ml/min; air change: 188/h; loading: 48.8 m²/m³; specimen surface area: 0.003 m²; chamber volume: 48 ml.

The values for the most important parameters in terms of amount are shown in the following table.

| Parameter | Test board [μg/m² × h] | Standard board [μg/m² × h] |
| --- | --- | --- |
| Hexanal | 304 | 510 |
| 3-Carene | 220 | 461 |
| α-Pinene | 361 | 588 |
| Pentanal | 64 | 119 |
| β-Pinene | 214 | 425 |
| Acetone | 52 | 95 |

As can be seen from the table, a significant reduction in the emission is observed for the most important parameters. The values are reduced to about half.

Working Example 2

Strands (length: max. 200 mm, width: 20 mm, thickness: max. 1 mm, moisture content: max. 50%) are produced from pine logs and treated with water having a temperature of 70° C. in a continuously operating process. The treatment is carried out in a vessel through which the strands are slowly transported. Holders-down ensure that the strands are completely under water. The treatment time/residence time in the tank is about 30 min.

The water present in the tank is continuously discharged from the process and freed of suspended materials and fine particles by filtration. Furthermore, the dissolved constituents are precipitated and the water is subsequently returned to the process. The discharged water had a COD (chemical oxygen demand) of 545 mg/l. It is therefore only moderately polluted with organic compounds and can be purified relatively easily.

The strands are then dried in a drum dryer. The energy consumption of the drum dryer is reduced significantly since the strands already have a temperature of about 60° C. on entry into the dryer. They are then coated in a coil with PMDI (about 3% by weight of glue based on dry matter of strands).

The glue-coated strands are scattered as covering layer and middle layer in an OSB plant. The percentage distribution between middle layer and covering layer is at least 70% to 30%. The strands are pressed to give boards which have a bulk density of about 590 kg/m³. After a storage time of about one week, the test board was tested together with a standard board having the same thickness for release of VOCs in a microchamber.

Chamber Parameters:

Temperature: 23° C.; humidity: 0%; airflow: 150 ml/min; air change: 188/h; loading: 48.8 m²/m³; specimen surface area: 0.003 m²; chamber volume: 48 ml.

The values for the most important parameters in terms of amount are shown in the following table.

| Parameter | Test board [μg/m² × h] | Standard board [μg/m² × h] |
| --- | --- | --- |
| Hexanal | 198 | 510 |
| 3-Carene | 171 | 461 |
| α-Pinene | 154 | 588 |
| Pentanal | 58 | 119 |
| β-Pinene | 17 | 425 |
| Acetone | 52 | 95 |

A significant reduction in the most important parameters is observed as a result of lengthening the treatment time with hot water. This is particularly prominent in respect of the terpenes. In the case of these, the emission is reduced by up to 95%.

The invention claimed is:

1. A process for producing wood-based OSBs comprising:
   a) production of wood strands from suitable timbers;
   b) treatment of at least part of the wood strands with water having a temperature in the range from 50° C. to 100° C. for a time of from 10 to 60 minutes;
   c) drying of the wood strands which have been treated in the water;
   d) coating of the wood strands which have been treated with water and dried and optionally coating of wood strands which have not been treated with water with at least one binder;
   e) scattering of the binder-coated wood strands on a conveyor belt; and
   f) pressing of the binder-coated wood strands to give a wood-based OSB.

2. The process according to claim 1, wherein water-treated wood strands or a mixture of water-treated wood strands and wood strands which have not been treated with water are used as middle layer and/or covering layer of the wood-based OSB.

3. The process according to claim 1, wherein the step of treatment of the wood strands with water is carried out separately from the production process for the OSBs or is integrated into the production process for the OSBs.

4. The process according to claim 1, wherein the wood strands which have been treated with water and have not been treated with water are coated with an amount of binder of from 1.0 to 5.0% by weight based on the total amount of the wood strands.

5. The process according to claim 1, wherein the binder-coated wood strands are pressed at temperatures in the range from 200 to 250° C. to give the wood-based OSB.

6. The process according to claim 1, wherein the wood strands which have been treated with water and have not been treated with water are coated with an amount of binder of from 2 to 4% by weight based on the total amount of the wood strands.

7. The process according to claim 1, wherein the binder-coated wood strands are pressed at temperatures in the range from 220 to 230° C. to give the wood-based OSB.

8. The process according to claim 1, wherein treatment of the wood strands are treated with water having a temperature in the range from 60 to 90° C.

9. The process according to claim 1, wherein treatment of the wood strands are treated with water having a temperature in the range from 70 to 90° C.

10. The process according to claim 1, wherein the treatment of the wood strands with water is carried out for a time of from 15 to 45 minutes.

11. The process according to claim 1, wherein the treatment of the wood strands with water is carried out for a time of from 20 to 30 minutes.

12. The process according to claim 1, wherein the wood strands are covered completely by water during the treatment.

13. The process according to claim 12, wherein the wood strands are completely immersed in the water.

14. The process according to claim 1, wherein the wood strands are conveyed continuously on at least one transport device through an apparatus containing the water for the water treatment.

15. The process according to claim 14, comprising discharging the water from the apparatus after passage of the wood strands.

16. The process according to claim 15, comprising purifying the water discharged from the apparatus and recirculating the purified water into the apparatus.

* * * * *